(12) United States Patent
Sennersten

(10) Patent No.: US 12,361,012 B2
(45) Date of Patent: Jul. 15, 2025

(54) DATA MODEL FOR MINING

(71) Applicant: Commonwealth Scientific and Industrial Research Organisation, Acton (AU)

(72) Inventor: Charlotte Sennersten, Acton (AU)

(73) Assignee: COMMONWEALTH SCIENTIFIC AND INDUSTRIAL RESEARCH ORGANISATION, Acton (AU)

( * ) Notice: Subject to any disclaimer, the term of this patent is extended or adjusted under 35 U.S.C. 154(b) by 0 days.

(21) Appl. No.: 18/011,299

(22) PCT Filed: Jun. 18, 2021

(86) PCT No.: PCT/AU2021/050631
§ 371 (c)(1),
(2) Date: Dec. 19, 2022

(87) PCT Pub. No.: WO2021/253089
PCT Pub. Date: Dec. 23, 2021

(65) Prior Publication Data
US 2023/0237061 A1    Jul. 27, 2023

(30) Foreign Application Priority Data
Jun. 19, 2020 (AU) .............................. 2020902032

(51) Int. Cl.
*G06F 7/00* (2006.01)
*G06F 16/2458* (2019.01)
(Continued)

(52) U.S. Cl.
CPC .......... *G06F 16/2465* (2019.01); *G06F 16/27* (2019.01); *G06T 19/003* (2013.01)

(58) Field of Classification Search
CPC ...... G06F 16/2465; G06F 16/27; G06F 16/29; G06F 16/134; G06F 16/212; G06F 16/22;
(Continued)

(56) References Cited

U.S. PATENT DOCUMENTS

2008/0243452 A1* 10/2008 Bowers ..................... G06F 9/30
703/2
2011/0202492 A1* 8/2011 Salemann ............... G06F 16/29
706/50

(Continued)

FOREIGN PATENT DOCUMENTS

WO  WO 2019/046899 A1  3/2019
WO  WO 2020/047338 A1  3/2020

OTHER PUBLICATIONS

Written Opinion of the International Searching Authority dated Jul. 29, 2021 in connection with PCT/AU2021/050631.
(Continued)

*Primary Examiner* — Mohammad A Sana
(74) *Attorney, Agent, or Firm* — Paul Teng

(57) ABSTRACT

This disclosure relates to managing data by an agent located within a mining operation. The data is stored as voxel data on a voxel net server. The server processes user input from a user controlling the agent within the mining operation and receives from the agent a request for voxel data associated with one or more voxels. The one or more voxels are a subset of voxels stored on the voxel net server and each of the one or more voxels is identified based on connections with voxels of previous requests. The server then queries a database representing the voxel net for the one or more voxels to retrieve associated voxel data based on the connections and returns the voxel data to the agent. Finally, the voxel data is displayed on a user device to the user.

17 Claims, 2 Drawing Sheets

(51) Int. Cl.
  *G06F 16/27* (2019.01)
  *G06T 19/00* (2011.01)
(58) Field of Classification Search
  CPC .. G06F 16/243; G06F 16/951; G06F 3/04815; G06F 3/011; G06T 19/003; G06T 17/05; G06T 15/08
  See application file for complete search history.

(56) References Cited

U.S. PATENT DOCUMENTS

| | | | |
|---|---|---|---|
| 2018/0181816 A1* | 6/2018 | Garud | H04N 19/20 |
| 2019/0272665 A1* | 9/2019 | X | G06T 15/08 |
| 2020/0027262 A1* | 1/2020 | Parra Vilchis | G06T 17/005 |
| 2020/0043186 A1 | 2/2020 | Selviah et al. | |
| 2022/0147791 A1* | 5/2022 | Yao | G06N 3/0495 |

OTHER PUBLICATIONS

International Search Report dated Jul. 29, 2021 in connection with PCT/AU2021/050631.

International Type Search Report dated Nov. 25, 2020 in connection with Australian Application No. 2020902032.

Bak, P. R. G., "Applied solid modelling in mineral resources engineering", Univ London, Thesis, published Jan. 1991 <https://spiral.imperial.ac.uk/bitstream/10044/1/46658/Bak-PRG-1991-PhD-Thesis.pdf>.

VoxelNET, "The 3D network connecting the intelligent Mine", 2017, <http://www.mining3.com/wp-content/uploads/2017/09/Voxelnet-Factsheet.pdf>.

Zhou, Y. et al., "Voxelnet: End-to-end learning for point cloud based 3d object detection", Proc IEEE Conf Computer Vision and Pattern Recognition, 2018, pp. 4490-4499 <https://Openaccess.thecvf.com/content_cvpr_2018/papers/Zhou_VoxelNet_End-to-End_Learning_CVPR_2018_paper.pdf>.

Martin, L. et al., "Discovery from 3D visualization and quantitative modelling", Proc. Exploration, vol. 7, 2007, pp. 543-550 <http://dmec.ca/ex07-dvd/E07/pdfs/37.pdf>.

Sennersten, C., "VoxelNet", Data 61, CSIRO, Mar. 2016, <http://72.52.166.148/conference2016/filesCOGNITIVE16/VoxelNet_CharlotteSennersten.pdf>.

* cited by examiner

DATA MODEL FOR MINING

CROSS-REFERENCE TO RELATED APPLICATION

The present application claims priority from Australian Provisional Patent Application No 2020902032 filed on Jun. 19, 2020, the contents of which are incorporated herein by reference in their entirety.

TECHNICAL FIELD

This disclosure relates to managing data for mining operations.

BACKGROUND

Most mining operations rely on block models and a number of software solutions are available that enable geologists and miners to build, review and use a block model. The block model comprises a number of blocks and each block has a uniform property, such as ore grade or mineral content. The block parameters are calculated based on exploration drilling or other measurements. Blocks without measurements are estimated through interpolation.

One existing block model is the Datamine block model. This block model is stored in a file with a *.dm suffix. Datamine files are random access files stored as flat tables without any implied hierarchic or network relationships. The model structure is defined in a "model prototype" file and the spatial context of each block is stored as part of the record for each block using implicit positioning, which saves both storage space and processing time. This is done using the IJK indexing code, allowing rapid access by the computer program to any part of the model.

Some mathematics relating to the IJK code are:

$$IJK = NZ \times NY \times I + NZ \times J + K$$

The IJK can also be determined from the model coordinates system:

$$I = ROUND[(Xc - XParentINC/2)/XParentINC] * XParentINC - XmORIG)/XParentINC$$

$$J = ROUND[(Yc - YParentINC/2)/YParentINC] * YParentINC - YmORIG)/YParentINC$$

$$K = ROUND[(Zc - ZParentINC/2)/ZParentINC] * ZParentINC - ZmORIG)/ZParentINC$$

Where XParentINC, YParentINC and ZParentINC are the X, Y and Z sizes of the Parent Blocks (to any subcells).

Other block model formats are Surpac models (*.mdl or *.fbm) and Vulcan block models (*.bmf). There may also be a block definition file (*.bdf).

A main concern to mining operations and their block models is how to populate the blocks based on assayed samples (such as exploration drilling). This is essentially a sampling of grades and interpolation/extrapolation into blocks. In this aspect, kriging plays an important role, which uses the spatial correlation between sample points and determines the weighting of the sample points for a prediction point. This process is similar to a spatial-based regression method to calculate an optimal weighting.

While existing block models serve well for mine planning, there are limitations to these models in other applications.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

Disclosed herein is a mining voxel net model that provides improved access to the voxel data and does not rely on an isolated data container, such as a file in which the voxel data is stored. Instead, the voxel data is accessible over a communication network and the voxel data can be retrieved voxel-wise on-demand. Such a data structure supports global use of voxel data, which becomes useful in big data applications, such as machine learning, as well as underground navigation.

There is provided a method for managing data by an agent located within a mining operation, the data being stored as voxel data on a voxel net server, the method comprising:
  processing user input from a user controlling the agent within the mining operation;
  receiving from the agent a request for voxel data associated with one or more voxels, the one or more voxels being a subset of voxels stored on the voxel net server, wherein each of the one or more voxels is identified based on connections with voxels of previous requests;
  querying a database representing the voxel net for the one or more voxels to retrieve associated voxel data based on the connections;
  returning the voxel data to the agent; and
  displaying the voxel data on a user device to the user.

The agent may be mobile; the request may comprise location data indicative of a current location of the agent; and querying the database may be based on the location data.

The agent may have a viewing direction; the request may comprise direction data indicative of the viewing direction of the agent; and querying the database may be based on the direction data.

The method may further comprise raytracing based on the viewing direction to determine the one or more voxels to be queried from the database.

The agent may be a real world vehicle. The agent may be a virtual reality agent. The agent may be controlled by a user navigating the virtual reality.

The database may be distributed. The database may comprise a distributed hash table.

The database may be partitioned so as to provide access to smaller data sets and can thus reduce the time taken to retrieve the request.

The agent may comprise sensors to capture properties of material in the mine; the method may comprise receiving measurement data indicative of capture properties of the mine and identification data identifying one or more voxels of the voxel model, and storing the measurement data as voxel data.

The agent may host a section of the database that stores the measurement data captured by the agent. A local database server may store the measurement data captured by the agent. The local database server may perform operations on the measurement data captured by the agent.

The method may further comprise performing analytics on the voxel data across multiple mines.

A system for voxel data storage in a mining operation, the system comprising:
an agent located within the mining operation;
a voxel net server to store the voxel data and configured to:
process user input from a user controlling the agent within the mining operation;
receive from the agent a request for voxel data associated with one or more voxels, the one or more voxels being a subset of voxels stored on the voxel net server, wherein each of the one or more voxels is identified based on connections with voxels of previous requests;
query a database, representing the voxel net for the one or more voxels to retrieve associated voxel data based on the connection; and
return the voxel data to the agent, wherein
the system further comprises a user device to display the voxel data to the user.

There is further provided a method for interrogating an interconnected voxel infrastructure database to return model output data to a user, the method comprises:
receiving from an agent located within a mining operation, data to be integrated with a voxel infrastructure;
integrating the data with the voxel infrastructure to generate an interconnected voxel infrastructure database stored on a server;
partitioning the voxel infrastructure database
requesting modelling data associated with one or more of the partitions, the one or more partitions being a subset of the integrated data;
querying the interconnected voxel infrastructure database for one or more output data so as to retrieve associated data based on the interconnections; and
returning the output modelling data to a user.

BRIEF DESCRIPTION OF DRAWINGS

An example will now be described with reference to the following drawings.

DESCRIPTION OF EMBODIMENTS

Figure 1:
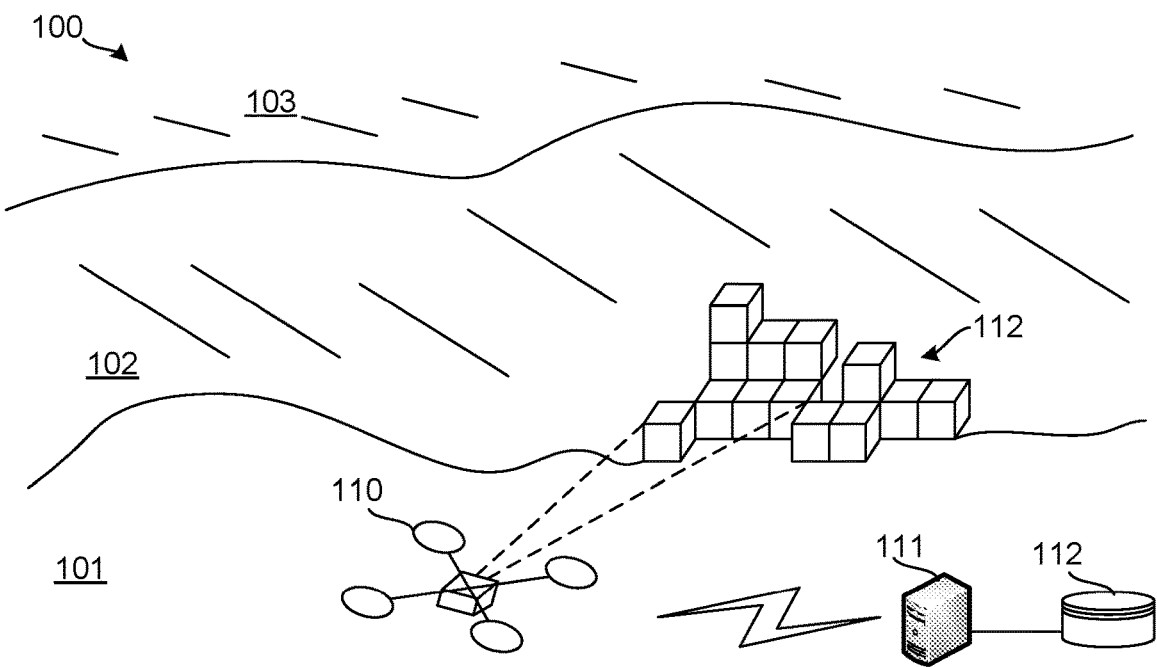
FIG. 1 illustrates a system for voxel data storage in a mining operation.

FIG. 1 illustrates a system 100 for voxel data storage in a mining operation. The mining operation comprises a mine floor 101 and a mine wall 102 and a mine roof 103, noting that system 100 may be used in vastly different mining environments. System 100 comprises an agent 110 located within the mining operation. In this example, the agent is an unmanned aerial vehicle (a drone) but may be a different agent, such as a land-based vehicle moving on wheels, tracks or legs, or other type of agent. The agent may also be an augmented reality device, such as Google Glass, worn by a human user. System 100 also comprises a voxel net server 111. The voxel net server 111 stores voxel data. FIG. 1 also shows a voxel net 112 but it is noted that the voxel net is not a physical object in the real-world (as shown in FIG. 1) but a virtual model stored in voxel net server 111. It is noted that the voxels of voxel net 112 are also referred to as "blocks" herein and the voxel net 112 is also referred to as a "block model".

Figure 2:
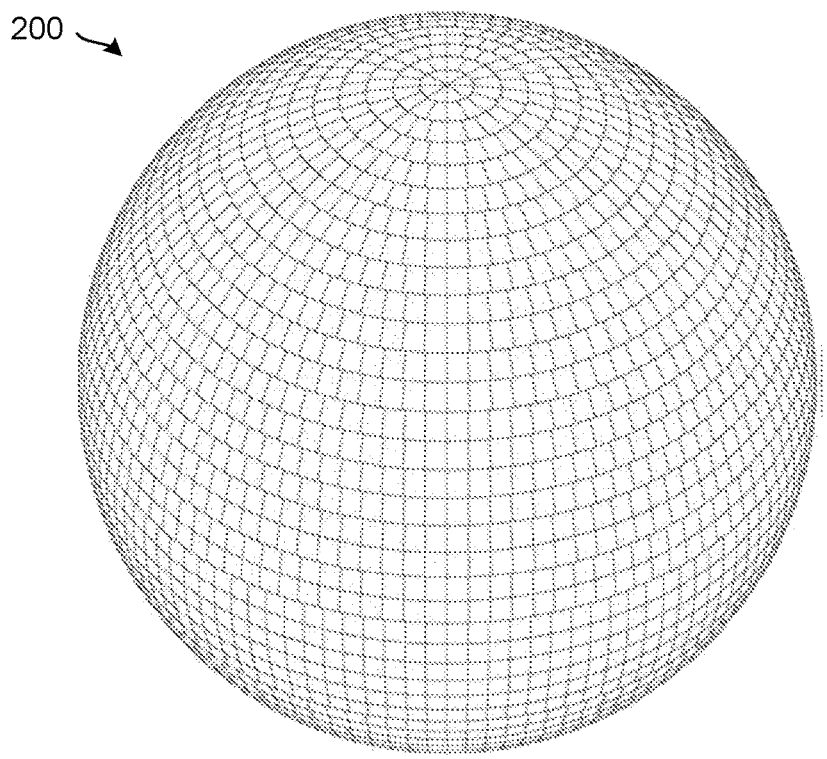
FIG. 2 illustrates a quantisation of the Earth into a unified voxel segmentation.

FIG. 2 illustrates a segmentation of the Earth into voxels of the voxel net 112. In this sense, the entire Earth is partitioned into voxels (or blocks) that are accessible using a unified access schema. This means the voxel net is a global model. While FIG. 2 only shows a surface segmentation into voxels, it is to be understood that the voxels extend into the inner volume of the Earth as well as into the space around the Earth. In one example, the default size of each voxel is 1 m×1 m×1 m but the size can have different values, may be variable and may be different for each voxel based on the required spatial resolution.

While reference may be made to 'blocks' herein, this is understood to have a broad meaning. In that sense, 'blocks' can be also referred to as voxels and a block model as a voxel net due to its internal data connectivity, its interconnection and the way each voxel is identified based on connections with blocks of previous requests.

Each voxel may have a number of attributes, including longitude, latitude and altitude of the centre point that voxel. Each voxel may further have as its attribute, geological information, such as ore grade or mineral concentration. A further attribute may relate to neighbours of each voxel, such that the voxels can be queried sequentially in a computationally efficient manner without iterating over all voxels to arrive at a given voxel.

Figure 3:
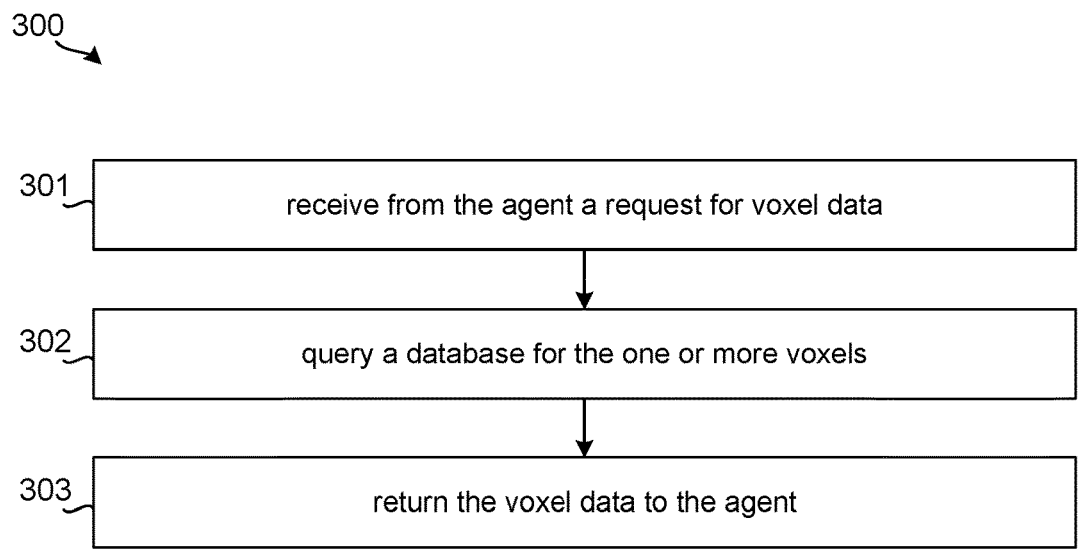
FIG. 3 illustrates a method for accessing voxel data.

FIG. 3 illustrates a method 300 as performed by voxel net server 111. In this sense, voxel net server 111 is configured to perform the steps of method 300. For example, voxel net server 111 may have software code stored on non-transitory computer readable medium that causes the voxel net server 111 to perform the steps of method 300.

In summary, method 300 is an on-demand data provisioning method for voxel data in a mining operation. This means that the voxel net does not need to be downloaded in full but can be provided to agent 110 or multiple agents at the same time on-demand. This allows the storage of a large, complex and detailed voxel net while at the same time, enabling low latency access to the voxel data. Further, voxels can be updated and the updated voxel data disseminated to all subscribed agents on a voxel by voxel basis. In other words, if a single voxel is updated by measurement data provided by a first agent, that single voxel can be provided to a second agent as an update or a newly requested voxel. This means two agents can be measuring material properties, such as two drills operating at the same time, or two hyperspectral cameras scanning a nearby surface of rock at the same time, while both agents receive real-time updates from the other agent on their voxel net. In addition, the control centre of the mining operation represents another agent, and the voxel net available at the control centre is also updated in real time as the measurements are received.

Returning to FIG. 3, voxel net server 111 receives 301, from the agent 110, a request for voxel data associated with one or more voxels. For example, the agent 110 provides an identifier or a location or another reference, such as a neighbourhood relationship to the voxel net server 111. Typically, the requested voxels are a subset of the voxels stored on the voxel net server, which means the request is not for the entire voxel net, since that would be impractically large and complex, and not absolutely required by the agent.

In response to receiving the request, voxel net server 111 queries 302 a database 112 for the one or more voxels to retrieve associated voxel data. For example, voxel net server 111 may search for an identifier or for a latitude, longitude, altitude (3D) coordinate. It is apparent now that a database query for a 3D coordinate may be computationally expensive since the entire database is searched for the three values in three respective columns. Therefore, it would be advantageous to have an addressing scheme that allows direct access to database elements without queries for values. For example, if each voxel stores the identifier, such as primary key, of its neighbours east/west/north/south/above/below, the database can be queried directly for that primary key. In that sense, the identifiers of neighbouring voxels represent connections between the voxels. Then, each voxel is identified based on connections with neighbouring voxels. In many applications, a query for a particular voxel would be subsequent of a query for a previous voxel and in most cases, the two queried voxels are neighbours of each other. Therefore, due to the connections, each voxel is identified based on connections with voxels of previous requests by retrieving neighbouring voxels primary keys from the previously requested voxel.

Each entry in the database relates to one voxel and the entries may be sorted by primary key, which makes a query for a particular voxel computationally efficient. This results in low latency of database queries and rapid retrieval of neighbouring voxels.

Finally, voxel net server 111 returns the voxel data to the agent. For example, the voxel data returned to the agent 111 comprises ore grade, mineral concentration etc.

As shown in FIG. 1, agent 110 is mobile, which means the agent 110 can move around the mining operation. This may be autonomous movement, remote controlled movement or directly driven, such as by an operator moving with the agent 110, such as a mining vehicle. In those examples, the request from the agent 110 to the voxel net server 111 may comprise location data indicative of a current location of the agent. For example, the request may include 3D location information, such as latitude, longitude and altitude. Server 111 then queries the database based on the location data. For example, server 111 may retrieve all voxels that are in the vicinity of the agent 110, such as all voxels that are within a given distance from the agent 110, such as 1 km. The agent 110 may also specify that distance for which the voxels are requested.

In yet another example, the location data may comprise inertial data that indicates the relative movement of the agent 110, which may be more readily available in underground mining operations. This inertial data is effectively an offset to the previous location, so server 111 can simply query for all voxels that are available at that offset from the previous location. In this sense, the inertial data directly maps to the neighbours within the voxel net, such that each update on the inertial data leads to a retrieval of one or more neighbours of the most recently queried voxels.

In a further example, the agent has a viewing direction. This may be the case where the agent 110 comprises a directional sensor, such as a camera or a LIDAR instrument. In that case, the request may comprise direction data indicative of the viewing direction of the agent. Server 111 then queries the database based on the direction data. For example, server 111 determines based on the current location of the agent 110 and the direction data, which voxels are "in view" of the agent 110. Server 111 may select the voxels that are in view based on a viewing angle, such that multiple voxels are selected.

Figure 4:
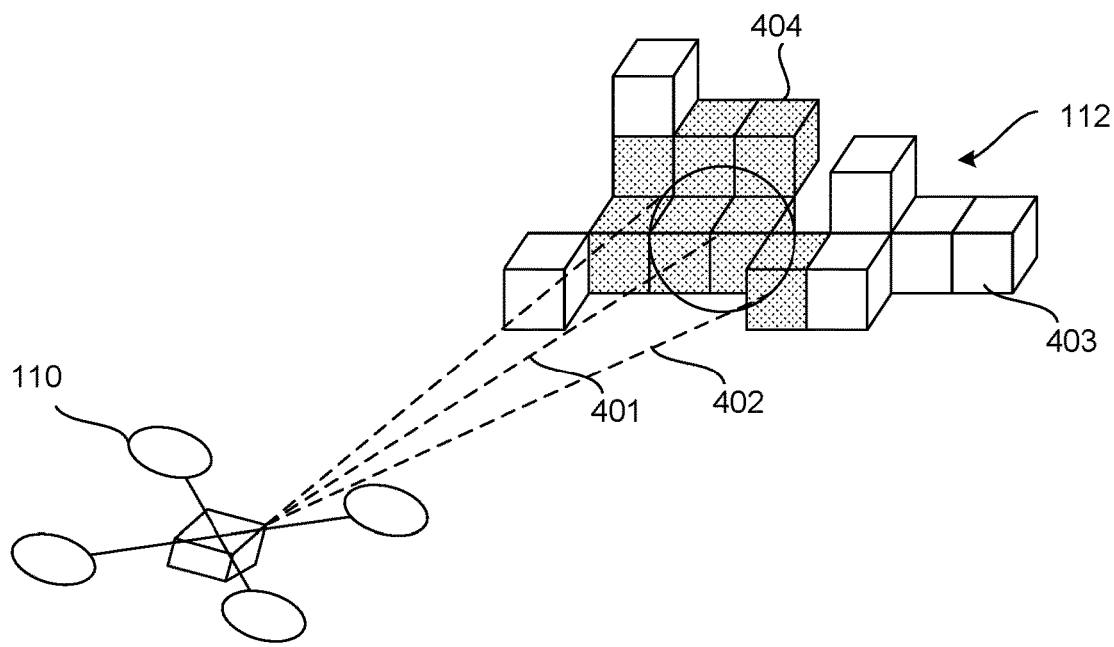
FIG. 4 illustrates an example of voxel selection

FIG. 4 illustrates an example of voxel selection, where agent 110 has a viewing direction 401 and a 2D angle that defines a cone 402 or beam. Server 111 selects voxels that are within the cone 402 around the viewing direction 401. In FIG. 4, the white voxels, which are outside the cone, such as voxel 403, are not selected while the shaded voxels, which are at least partly inside the cone 402, such as voxel 404, are selected, queried and sent back to the agent 110.

One way of realising this determination is a raycasting technique where the server 111 calculates the trace of a ray of light cast from the agent 110 and determines where that ray of light hits a surface of the mine in the voxel net. Server 111 then returns the 'lit' voxels. At this point it is noted that empty space (void) in the real world may be represented by the absence of voxels in the voxel net or by voxels being annotated as 'void' or 'air'.

The advantage is that agent 110 now has real-time access to the voxels that are in view, which means agent 110 can process the data from the voxel net 112 at the same time as the sensor data. For example, agent 110 can use the data from the voxel net 112 to navigate through the mine. More particularly, agent 110 can identify features in its field of view detected by the sensor, such as 3D shape features in a LIDAR point cloud or image features in an RGB or infrared image, and match those features against the features in the voxel net. In that sense, the features in the voxel net may be detected by the agent 110 based on the received voxel data or by the server 111. In yet another option, the features may be stored in the voxel net as voxel attributes. For example, each voxel may be labelled as bellowing to a particular feature. This way, registration of the image or point cloud from the agent 110 is greatly facilitated because the features in the image or point cloud are only matched against features in voxels that are "in view" and not against the entire voxel net. This is particularly useful for simultaneous localisation and mapping (SLAM) of multiple agents at the same time, where detected features are shared between the agents in real time.

While the above examples relate to real-world agents, the agent may equally be a virtual reality agent. In this sense, the agent is an object in a virtual reality that is defined by the voxel net. The agent may be an avatar of a user or simply a point within the virtual reality that represents the location of the user within the virtual reality. The user may control a viewing direction of the agent within the virtual reality and the voxel net server 111 may then provide the voxel data of voxels that are in view. The user may also navigate the agent through the virtual reality by moving the agent and rotating the agent.

While server 111 is shown as a single component, the database 112 may be distributed across multiple locations. For example, each mine site may have a local server that stores and processes the voxel data locally. However, each of these servers also has access to all other servers so that mine data can be accessed globally through a unified addressing scheme.

More particularly, the database 112 may comprises a distributed hash table. This means each voxel is addressable by its unique hash and each server manages its own hash table. This way, additional mine sites can be added seamlessly to the network of hosting servers. There are a number of distributed file systems and peer-to-peer network protocols for distributed files systems, including Amazon S3/Aurora, Hadoop Distributed File System or TiDB by PingCAP Inc. Other examples include a distributed database or data grid comprising a middleware layer that provides services and applications necessary for efficient management of the voxel data.

While the previous examples provide a method for accessing data stored on database 112, agent 110 may also update the data of the voxel net. More particularly, the agent 110 may comprise sensors to capture properties of material in the mine. These sensors may include a RGB camera, infrared/thermal camera, LIDAR range finder, hyperspectral camera, radar, chemical (composition) electrical (conductivity), X-ray fluorescence, gamma ray and other sensors.

Agent 110 captures the sensor data and associates the sensor data with a particular voxel of the model. For example, agent 110 stores the sensor data together with a location and/or viewing direction of the sensor a metadata. Agent 110 then sends the sensor data and metadata to the server 111.

In turn, the server 111 receives the measurement data, which is indicative of captured properties of the mine and identification data (e.g., metadata) identifying one or more voxels of the voxel net. Consequently, server 111 stores the measurement data as voxel data. In this sense, server 111 updates the voxel data to incorporate the sensor data. The updated voxel data may also be an interpolation or extrapolation of the sensor data, which is useful where the location of the sensor data capture is not exactly identical to the location of the voxel in the voxel net.

While agent 110 and server 111 are shown as separate components, it is equally possible that the database 112 is integrated with the agent, such that the agent hosts a section of the database that stores the measurement data captured by the agent. In this sense, agent 110 is a node in the distributed database that stores the global voxel net and other devices can access the data directly from agent 110.

A local database server may therefore be any device, entity or component where the voxel data is stored. Therefore, the local database server can perform operations on the measurement data captured by the agent and the voxel data. For example, local data base server 111 may perform the interpolation or extrapolation and machine learning or data extraction locally. This has the advantage that the extracted information and/or features are typically significantly smaller, which means less bandwidth is required between the mine site and the control centre, for example.

Since the voxel data is stored in a globally accessible format, it is possible to perform analytics on the voxel data across multiple mine sites. This is a significant advantage because the accuracy of analytics outcomes increases with the number of samples and is therefore better for multiple mine sites.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A computer-implemented method for managing data by an agent located within a mining operation, the data being stored as voxel data on a voxel net server, the computer-implemented method comprising:
 processing user input from a user controlling the agent within the mining operation;
 receiving from the agent a request for voxel data associated with one or more voxels, the one or more voxels being a subset of voxels stored on the voxel net server, wherein each of the one or more voxels is identified based on connections with voxels of previous requests;
 querying a database representing the voxel net for the one or more voxels to retrieve associated voxel data based on the connections with the voxels of the previous requests;
 returning the voxel data to the agent; and
 displaying the voxel data on a user device to the user.

2. The method of claim 1, wherein
 the agent is mobile;
 the request comprises location data indicative of a current location of the agent; and
 querying the database is based on the location data.

3. The method of claim 2, wherein
 the agent has a viewing direction;
 the request comprises direction data indicative of the viewing direction of the agent; and
 querying the database is based on the direction data.

4. The method of claim 3, further comprising raytracing based on the viewing direction to determine the one or more voxel to be queried from the database.

5. The method of claim 1, wherein the agent is a real world vehicle.

6. The method of claim 1, wherein the agent is a virtual reality agent.

7. The method of claim 6, wherein the agent is controlled by a user navigating the virtual reality.

8. The method of claim 1, wherein the database is distributed.

9. The method of claim 8, wherein the database comprises a distributed hash table.

10. The method of claim 8, wherein
 the agent comprises sensors to capture properties of material in the mine;
 the method comprises receiving measurement data indicative of capture properties of the mine and identification data identifying one or more voxels of the voxel net, and storing the measurement data as voxel data.

11. The method of claim 10, wherein the agent hosts a section of the database that stores the measurement data captured by the agent.

12. The method of claim 11, wherein a local database server stores the measurement data captured by the agent.

13. The method of claim 12, wherein the local database server performs operations on the measurement data captured by the agent.

14. The method of claim 1, further comprising performing analytics on the voxel data across multiple mines.

15. The method of claim 1, wherein the method further comprises interrogating an interconnected voxel infrastructure database to return model output data.

16. The method of claim 15, wherein the method further comprises:
 receiving from the agent, data to be integrated with a voxel infrastructure;
 integrating the data with the voxel infrastructure to generate an interconnected voxel infrastructure database stored on the voxel net server;
 partitioning the voxel infrastructure database;
 requesting modelling data associated with one or more of the partitions, the one or more partitions being a subset of the integrated data;
 querying the interconnected voxel infrastructure database for one or more output data so as to retrieve associated data based on the interconnections; and
 returning the output modelling data to the agent.

17. A computer-implemented system for voxel data storage in a mining operation, the computer-implemented system comprising:
 a voxel net server comprising memory to store the voxel data and a processor configured to:
  process user input from a user controlling the agent within the mining operation;

receive from the agent a request for voxel data associated with one or more voxels, the one or more voxels being a subset of voxels stored on the voxel net server, wherein each of the one or more voxels is identified based on connections with voxels of previous requests;

query a database, representing the voxel net for the one or more voxels to retrieve associated voxel data based on the connections with the voxels of the previous requests; and return the voxel data to the agent, wherein the system further comprises a user device to display the voxel data to the user.

* * * * *